United States Patent
Schmitt

(10) Patent No.: US 7,519,394 B2
(45) Date of Patent: Apr. 14, 2009

(54) METHOD FOR THE PROVISION OF OPERATOR-SPECIFIC PERFORMANCE FEATURES OF DIFFERENT MOBILE RADIO NETWORK OPERATORS FOR A MOBILE RADIO CUSTOMER

(75) Inventor: Harald Schmitt, Bendorf (DE)

(73) Assignee: T-Mobile Deutschland GmbH, Bonn (DE)

( * ) Notice: Subject to any disclaimer, the term of this patent is extended or adjusted under 35 U.S.C. 154(b) by 35 days.

(21) Appl. No.: 10/529,756

(22) PCT Filed: Sep. 29, 2003

(86) PCT No.: PCT/DE03/03251

§ 371 (c)(1),
(2), (4) Date: Dec. 4, 2006

(87) PCT Pub. No.: WO2004/032545

PCT Pub. Date: Apr. 15, 2004

(65) Prior Publication Data
US 2007/0099661 A1    May 3, 2007

(30) Foreign Application Priority Data
Sep. 30, 2002    (DE) ................................. 102 45 846

(51) Int. Cl.
    H04B 1/38    (2006.01)
(52) U.S. Cl. ........................ 455/558; 455/415; 455/417;
    379/88.19; 379/88.21; 379/88.2; 379/211.05
(58) Field of Classification Search ................. 455/558,
    455/433, 552.1, 553.1; 379/89.19, 88.21,
    379/88.2, 211.05, 142.01–142.14, 127.01–127.06
    See application file for complete search history.

(56) References Cited

FOREIGN PATENT DOCUMENTS

| EP | 0 344 989 A | 12/1989 |
| EP | 344989 A2 * | 12/1989 |
| GB | 2 338 862 A | 12/1999 |
| WO | WO 99/27724 A | 6/1999 |
| WO | WO 99/62282 | 12/1999 |
| WO | WO 9962282 A1 * | 12/1999 |
| WO | WO 01/28205 A2 | 4/2001 |
| WO | WO 02/21872 A1 | 3/2002 |

* cited by examiner

Primary Examiner—Dung Lam
(74) Attorney, Agent, or Firm—Browdy and Neimark, P.L.L.C.

(57) ABSTRACT

The invention relates to a method for the provision of operator-specific performance features of different mobile radio network operators for a mobile radio customer, whereby the mobile radio customer has a smart card, on which a user relationship for the mobile radio customer with a mobile radio network operator is stored. The method is characterized in that at least two user relationships are defined on the smart card of the mobile radio customer with differing mobile radio call numbers and with independent performance features and a mobile radio network operator is assigned to each user relationship.

6 Claims, 1 Drawing Sheet

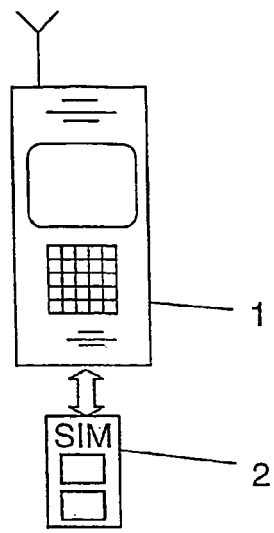
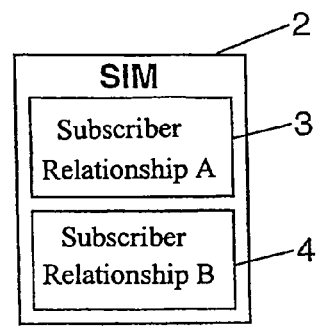
FIG. 1
FIG. 2
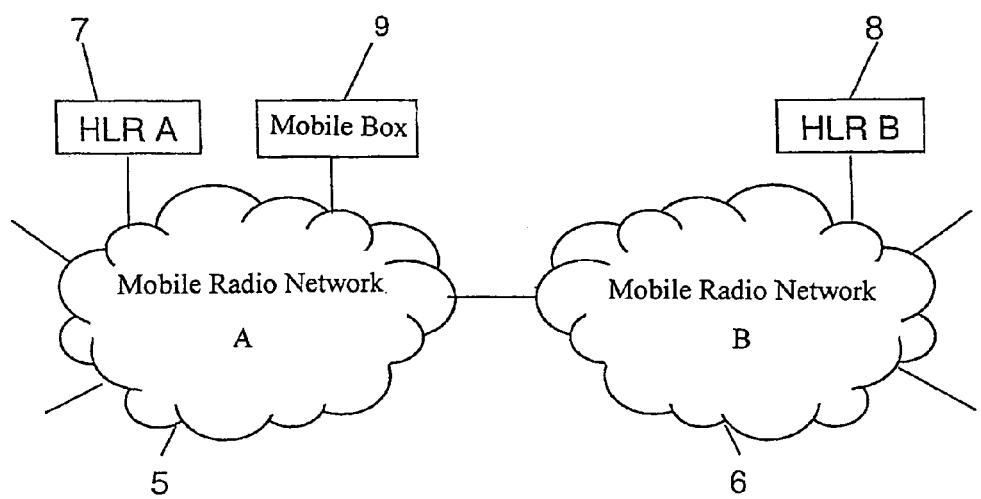
FIG. 3

METHOD FOR THE PROVISION OF OPERATOR-SPECIFIC PERFORMANCE FEATURES OF DIFFERENT MOBILE RADIO NETWORK OPERATORS FOR A MOBILE RADIO CUSTOMER

FIELD

The invention relates to a method for the provision of operator-specific performance features of different mobile radio network operators for a mobile radio customer, whereby the mobile radio customer has a Smart Card, on which a subscriber relationship of the mobile radio customer with a mobile radio network operator is arranged.

BACKGROUND

By way of the so-called national and international roaming, customers of modern mobile radio networks, such as GSM and UMTS, are able to use, in other countries and with other network operators, services of the respective "foreign" mobile radio network. However, in the case of the roaming, the performance features a customer can use in the foreign network are limited to the performance features that have been activated in the home network. This is caused by the fact that during the roaming, the performance features that are activated for the mobile radio customer are queried from the so-called home location register of the home network and the performance features in the foreign network are made available to the customer based on these authorizations.

As a result it is not possible to use additional performance features in the foreign network that are not available in the home network, and which are therefore also not activated for the customer.

An additional shortcoming of the roaming is that a mobile radio customer is reachable in the foreign network only at his international mobile number of the home network. As a result, a caller in the country of the foreign network needs to always use the international home-location number of the mobile radio customer, even though the mobile radio customer is staying in the same country. Additionally, the caller is billed fees for international calls, even though the mobile radio customer is located in the same country.

SUMMARY

It is an object of the invention to provide a method whereby performance features in a foreign network can be put at a mobile radio customer's disposal that are not available in his home network. It is an additional object of the invention to provide a method whereby mobile radio customers are reachable in foreign networks at national phone numbers and therefore no international calling fees result for callers within the foreign network.

These objects are met according to the invention with the characteristics of claim 1.

The inventive method provides for a separate subscriber relationship to be created for each desired mobile radio network, i.e., a separate subscription of the mobile radio customer's. In this manner the mobile radio customer receives in each desired mobile radio network a separate network-specific identification (mobile phone number). This is achieved in such a way that on a Smart Card of the mobile radio customer, a separate SIM (Subscriber Identity Module) application or USIM (UMTS Subscriber Identity Module) application is applied. The customer thus has only one Smart Card with multiple logical, network-specific SIMs. In accordance with the network-specific SIMs, a separate subscriber profile in the HLR (Home Location Register) must be provided for the mobile radio customer in each network. Since this makes the mobile radio customer individually administratable in each network, specific performance features can be administered for the customer in each mobile radio network. By means of this measure, different authorizations can be provided for a customer depending on the network being used at a given time.

A mobile radio customer therefore has, in network A, an identification (phone number) A, and as a result authorizations (performance features) A specific to network A. For network B, the customer has the identification B and the authorizations B, etc.

In an improvement of the method, provision is made by the invention that the active identification (phone number) of the mobile radio customer, which is either manually selected by the mobile radio customer or automatically activated in dependence upon the current location of the mobile radio customer, is always the one that corresponds to the mobile radio network being used. The active identification (phone number) is always that of the currently used network. This may be achieved, e.g., by means of automatic algorithms on the given Smart Card that start the currently required SIM application. This measure ensures that the authorizations being applied are always those of the currently used network.

If the customer is located within network A, the identification of network A is active, and therefore the authorizations of network A. In network B, the identification of network B is active with the authorizations B, etc.

In a further development of the invention, provision is made through network-based solutions to compile the individual network-specific phone numbers of the mobile radio customer's in such a way that the mobile radio customer can be reached at each network-specific phone number at all times. This means that the mobile radio customer is reachable, regardless of his current location and thus regardless of the active identification (phone number), at any of the identifications (phone numbers) provided for him. This method of operation is achieved by intelligent control of call redirections in the respective networks. The call redirections of all involved networks, except for the network of the current location of the mobile radio customer, always point to the currently active identification (phone number) of the mobile radio customer. The call redirections must be newly set accordingly with each change of the customer's identification. This renewed programming of the call redirection shall be provided for automatically by means of corresponding intelligent technologies, e.g., in an IN node.

If the mobile radio customer is located within network A and his identification (phone number) for network A is therefore active, the customer can nevertheless be reached at his identification (phone number) for network B. For this purpose the call redirections must be set in network B to the identification (phone number) A. If the customer changes from network A to network B, the call redirections of both networks A and B must be changed.

In an additional improvement of the invention, provision is made with respect to the calling line identification presentation (CLIP) function of the mobile radio customer that, in dependence upon the phone number dialed by the mobile radio customer, a corresponding identification of the mobile radio customer is transmitted to the subscriber being called. This ensures that in each network or country the same phone number of the mobile radio customer is always displayed regardless of the currently active identification/phone number of the customer. An implementation of this function may take place in intelligent network nodes, e.g., in an IN node.

The mobile radio customer is located within network B and his identification B is therefore active. If the mobile radio customer calls a subscriber in network A, the identification A of the mobile radio customer is transmitted by means of CLIP to the subscriber being called, even though the mobile radio customer currently has identification B activated.

An additional embodiment of the invention permits the mobile radio customer to be assigned one and always the same mobile box. In which network the mobile box is established and used is of no importance. However, the mobile box is preferably established in the mobile radio customer's home network. In order for each caller to reach the mobile radio customer's mobile box regardless of his current location and current identification, the call redirections must be set in the network of the current location of the mobile radio customer to the mobile box. When the mobile radio customer's identification changes, the call redirections must be automatically reprogrammed by means of intelligent functions.

The mobile radio customer is located in network B and his identification B is active. The call redirections in network B point to the mobile box of the mobile radio customer. A caller from network A dials the identification A of the mobile radio customer. By means of the call redirections in network A the call is forwarded to network B. In network B the call redirection operations point to the mobile box. If the customer changes from network B to network A, the call redirections in network A must be changed to the mobile box.

BRIEF DESCRIPTION OF THE DRAWINGS

FIG. 1 shows a schematic drawing of a mobile radio end unit into which a Smart Card is inserted according to one embodiment of the present invention;

FIG. 2 illustrates at least two subscriber relationships defined on a Smart Card according to one embodiment; and FIG. 3 illustrates at least two mobile networks, each including a home location register according to one embodiment.

DETAILED DESCRIPTION

Additional characteristics of the invention will become apparent from the figures in the drawing.

FIG. 1 shows a schematic illustration of a mobile radio end unit 1 that is operated with a Smart Card 2.

FIG. 2 illustrates that on the Smart Card 2 at least two subscriber relationships 3 and 4 are defined. One subscriber relationship for a mobile radio network A and one subscriber relationship for a mobile radio network B.

Shown in FIG. 3 are two mobile radio networks 5 and 6 (A and B), each of which comprises a home location register (HLR) 7 and 8. The subscriber has assigned to him in each mobile radio network his own subscriber relationship, whose subscriber profile is stored in the given HLR 7 or 8. However, the subscriber has only one single mobile box 9, which is arranged, for example, in the mobile radio network A and can be addressed via both mobile radio networks.

What is claimed is:

1. A method for providing network operator-specific performance features of different mobile radio network operators to a mobile radio customer, comprising:

providing a Smart Card for the mobile radio customer, configured to allow at least one subscriber relationship of the mobile radio customer with at least one mobile radio network operator to be defined, defining at least two subscriber relationships on the Smart Card of the mobile radio customer, each subscriber relationship having different mobile phone numbers and separate performance features associated with the different mobile phone numbers, assigning each subscriber relationship to a different mobile radio network operator, the separate performance features being available to the mobile radio customer based on the mobile radio network operator for that subscriber relationship, redirecting calls at each network operator provided for the mobile radio customer, said call redirections being performed in all involved networks, except for the network of the current location of the mobile radio customer, by always pointing to the currently active identification and phone number of the mobile radio customer, newly setting the call redirections accordingly with each change of the mobile radio customer's location into a new one of the involved networks;

automatically renewing programming of the call redirection by means of appropriate intelligent technologies;

using the number of the mobile radio customer that is specific to a destination network of the call as the phone number that is transmitted in the calling line identification presentation function, regardless of the current location of the mobile radio customer; and signaling the subscriber being called with the mobile phone number of the mobile customer that is specific for each given country or network.

2. A method according to claim 1, comprising storing, on the Smart Card, SIM and/or USIM applications assigned to the respective subscriber relationships.

3. A method according to claim 1, wherein only one subscriber relationship is active at any given time.

4. A method according to claim 1, further comprising, for each existing subscriber relationship, providing an assigned subscriber profile in a home location register of the respective network operator.

5. A method according to claim 1, further comprising assigning the mobile radio customer only one mobile box.

6. A method according to claim 1, wherein the step of redirecting the call comprising setting the call redirection in the network of the current location of the mobile radio customer to a mobile box; and when the subscriber relationship is switched, automatically reprogramming the call redirections by means of intelligent functions.

* * * * *